United States Patent [19]

Smart et al.

[11] Patent Number: 4,709,886

[45] Date of Patent: Dec. 1, 1987

[54] HIGH TEMPERATURE PIPE AND DUCT SUPPORT

[75] Inventors: Leonard G. Smart, Monrovia; Henry T. Hui, Arcadia, both of Calif.

[73] Assignee: CF Braun & Company, Alhambra, Calif.

[21] Appl. No.: 829,446

[22] Filed: Feb. 13, 1986

[51] Int. Cl.⁴ ............................................. F16L 3/16
[52] U.S. Cl. .................................. 248/49; 248/DIG. 1
[58] Field of Search ..................... 248/49, 55, DIG. 1, 248/74.1, 74.3, 58, 128, 139–141, 146

[56] References Cited

U.S. PATENT DOCUMENTS

| 1,818,961 | 8/1931 | Kramer | 248/49 |
| 2,106,956 | 2/1938 | Nakamura | 248/49 |
| 2,113,083 | 4/1938 | Height | 248/49 |
| 2,151,298 | 3/1939 | Miller | 248/49 |
| 2,307,915 | 1/1943 | Boardman | 248/49 |
| 4,389,034 | 6/1983 | Suttles | 248/49 |

FOREIGN PATENT DOCUMENTS

| 883683 | 6/1953 | Fed. Rep. of Germany | 248/49 |
| 24693 | 6/1956 | Fed. Rep. of Germany | 248/49 |
| 1203187 | 10/1965 | Fed. Rep. of Germany | 248/49 |
| 118949 | 9/1979 | Japan | 248/DIG. 1 |
| 451885 | 11/1974 | U.S.S.R. | 248/49 |

Primary Examiner—Reinaldo P. Machado
Assistant Examiner—A. Chin-Shue
Attorney, Agent, or Firm—Lyon & Lyon

[57] ABSTRACT

A pipe or duct support apparatus which includes a cradle attached to the pipe or duct. The cradle is supported by a frame positioned adjacent the pipe or duct and offers minimal resistance to radial expansion and contraction. To provide for longitudinal pipe or duct displacement the frame may be mounted on pivotally mounted rocker arms. A pin and slot arrangement retains the frame in position on the rocker arms. Frame translation will not alter the centerline elevation of the pipe or duct.

6 Claims, 3 Drawing Figures

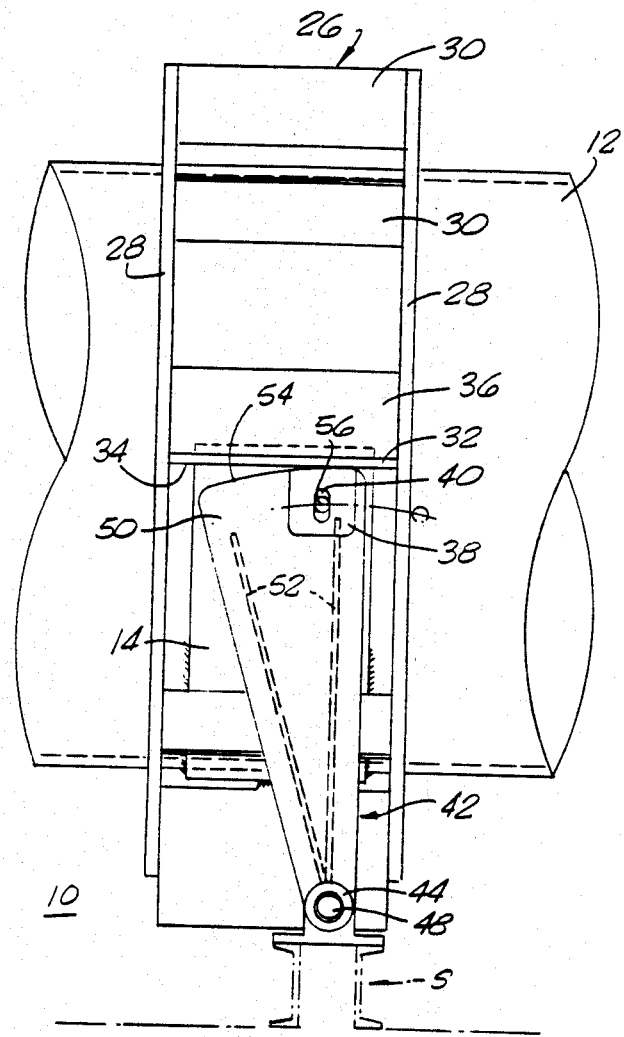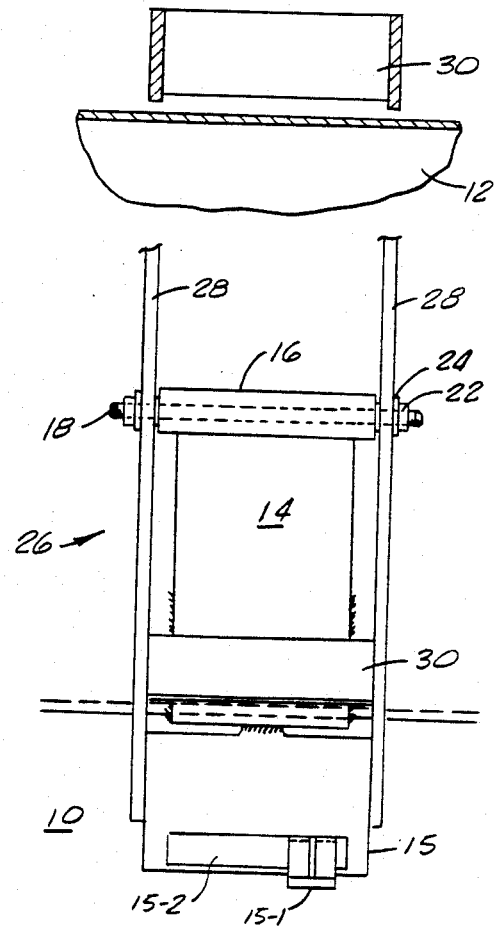
FIG. 2
FIG. 3

HIGH TEMPERATURE PIPE AND DUCT SUPPORT

FIELD OF THE INVENTION

The field of the present invention is support apparatus for pipes and ducts, in particular, pipes and ducts carrying fluids at elevated temperature.

BACKGROUND OF THE INVENTION

In pipes and ducts subject to temperature extremes, radial and longitudinal expansion thereof may render support design critical. The support structure, which must provide adequate securement for the pipe or duct, will often act in opposition to expansion and contraction forces thereby inducing significant stresses in the pipe or duct member. The result can be premature and costly failure.

To date, there have been various suggestions proposed as solutions for this problem. For example, supports have been proposed wherein the pipe or duct is welded to rocker-support rings. Although the pipe or duct is free to expand and contract longitudinally, high local stresses are imposed on the pipe or duct wall. Other suggestions include rigidly attaching the pipe or duct to support rings or straps which are suspended by spring-biased hangers. These supports permit longitudinal expansion and provide vertical and lateral support. However, the support rings or straps tend to restrict radial expansion. Moreover, because the spring biased support pivots, longitudinal expansion and contraction tend to result in elevational changes in the pipe or duct, which is particularly undesirable when connecting to sensitive machinery.

Accordingly, it is desirable to have an apparatus to support a pipe and duct that provides adequate lateral and vertical support, but does not resist radial and longitudinal expansion, and maintains centerline elevation throughout operational temperature changes.

SUMMARY OF THE INVENTION

The present invention is directed to an apparatus for supporting a pipe or a duct. The apparatus includes a cradle to provide vertical and lateral support for the pipe or duct while offering little resistance to radial expansion and contraction. Associated with the cradle is a frame. The frame may be supported in a manner which allows frame movement along the pipe or duct axis. When the pipe or duct expands or contracts longitudinally the frame moves freely with the duct or pipe while centerline elevation is maintained.

BRIEF DESCRIPTION OF THE DRAWINGS

FIG. 2 is a side view of the pipe or duct taken along line 2—2 in FIG. 1.

FIG. 3 is a cross-sectional view taken along line 3—3 in FIG. 1.

DETAILED DESCRIPTION OF THE PREFERRED EMBODIMENT

Figure 1:
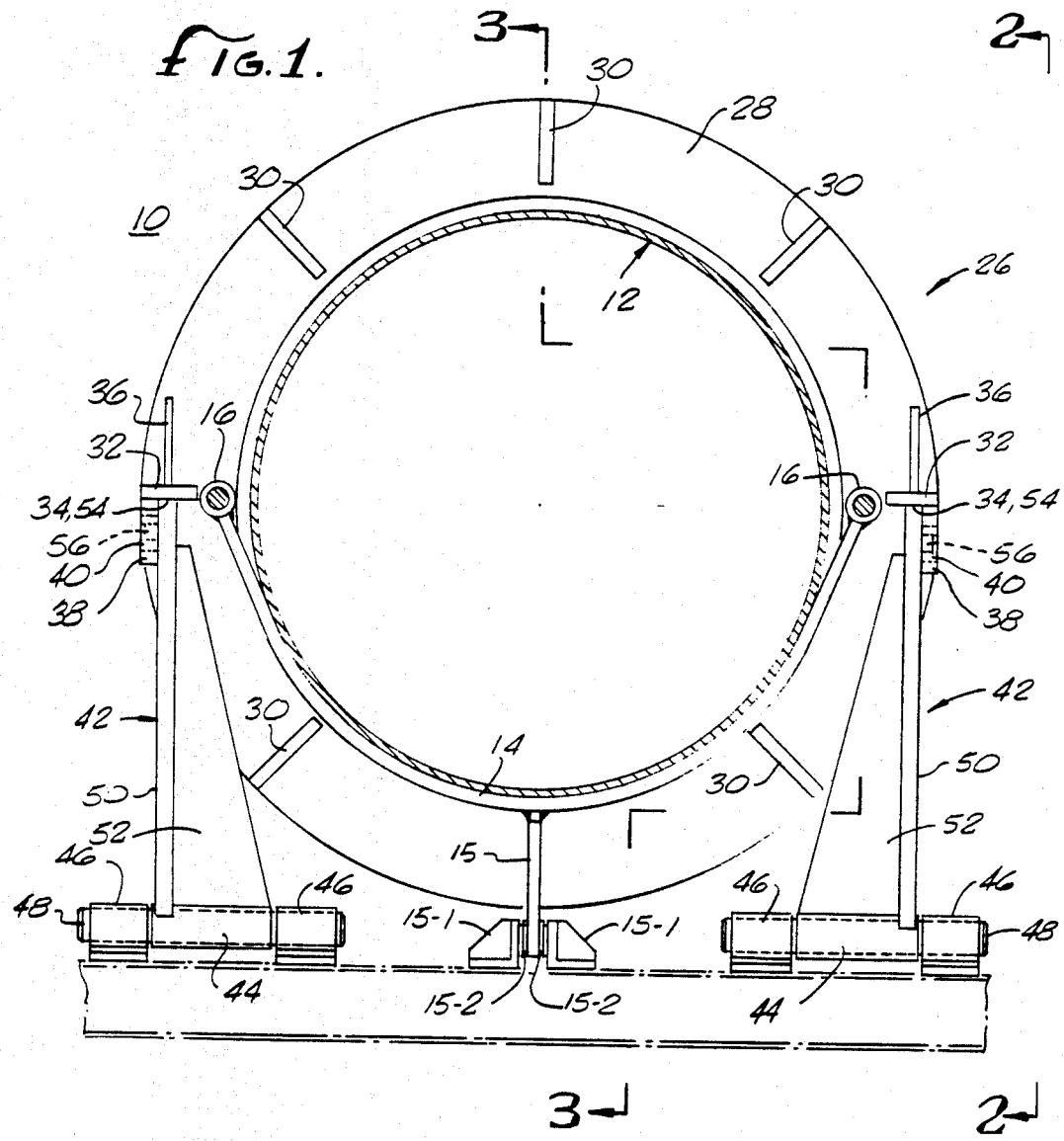
FIG. 1 is a cross-sectional view of a pipe or duct supported in accordance with the present invention.

Referring to FIGS. 1 and 3, a pipe and duct support apparatus 10 is shown. Providing immediate support for the pipe or duct 12 is a cradle member 14. In the present embodiment, the cradle 14 appears as a strap or strip-like member and is fabricated from any suitably ductile material, as for example, steel or the like. The cradle 14 must be thick enough to provide suitable lateral and vertical support for the duct. Due to the surface contact with the duct, temperature will be similar and the cradle will offer minimum resistance to radial expansion. The cradle 14 is attached to the pipe or duct 12 by welding on a small arc at bottom of pipe or duct.

To provide additional lateral support for the pipe or duct 12, and to prevent twisting, an optional keel member 15 may be provided. The keel 15 is welded to the cradle member 14 approximately midway between each end thereof and extends toward a support surface S, normal to the surface of the cradle 14. Mounted on support surface S are a pair of guide members 15-1 providing lateral restraint for the keel 15. Reduced friction pads 15-2 of any suitable low friction material are provided between the keel 15 and the guide members 15-1 to permit the keel 15 to slide freely during longitudinal pipe or duct expansion.

At the ends of the cradle 14, on either side of the pipe or duct 12, are a pair of cylindrical end members 16, welded thereto. As shown in FIG. 3, extending through the end members 16 are bolts 18. The bolts 18 are sized to permit the end members 16 to pivot thereabout. The bolts 18 are retained in position by conventional nut and washer means 22 and 24 on a frame 26, now to be described.

In the present embodiment, the frame 26 includes a pair of annular rings 28. The rings 28 are positioned adjacent the pipe or duct 12, circumscribing same in this case, and are spaced from each other along the pipe as duct axis. Joining the rings 28 to form the integral frame 26 are a plurality of flanges 30. Thus, the frame 26, positioned adjacent the pipe or duct 12, provides support for the cradle member 14, which is suspended from the sides of the frame 26 at locations on both sides of the pipe or duct 12. Because the two end portions of the cradle 14 are pivotally supported by the frame 26, radial pipe or duct expansion is facilitated.

As shown in FIGS. 1 and 2, also secured to frame 26 are a pair of frame support members 32 having cam following surfaces 34. Flanges 36 help maintain the support members 32 in fixed position. Positioned on the frame support members 32, adjacent the cam following surfaces 34, are tab members 38. The tab members 38 extend perpendicularly to the cam following surfaces 34 and include elongated apertures or slots 40.

In the present embodiment the frame 26 may be mounted to the support surface S by a pair of pivoting members or rocker arms 42. Thus, the frame is free to translate longitudinally along the pipe or duct axis. The rocker arms 42 include cylindrical base portions 44 that are positioned between a pair of stays 46 and retained in position by a pin 48. The stays 46 are in turn secured to the support surface S. Extending from the base portions 44 of the rocker arms 42 are arm portions 50. Support for the arm portions 50 is provided by a pair of rocker arm flanges 52. The arm portions 50 are roughly triangular in shape, flaring out from the base portions 44. As shown in FIG. 2, the free ends of the rocker arms 42 comprise cammed surfaces 54. In the present embodiment, the cammed surfaces 54 define an arc having a center of curvature at the center line of the pin 48. The cammed surfaces 54 provide support for the frame 26 at the cam following surfaces 34 thereof. To secure the frame 26 to the rocker arms 42, the rocker arms 42 are provided with pins or detents 56 protruding from the arm portions 50, perpendicularly thereto. The detents 56 fit into the slots 40 in the frame tab members 38. Thus, when the frame 26 translates longitudinally along the duct axis, it will cause the rocker arms 42 to pivot. Because the cammed surfaces 54 of the rocker arms 42 are arcuate and because the detents 56 are free to ride in the slots 40, centerline elevation of the duct 12 will be maintained. Additionally, should it be desired to place the pipe or duct at a predetermined centerline elevation, for example during startup operations, the rocker arms may be pivotally adjusted to follow the elevation change.

Accordingly, a pipe or duct support apparatus is disclosed wherein the pipe or duct is secured from vertical and lateral movement, wherein the pipe or duct is not restrained from expanding radially or longitudinally, and wherein center line elevation of the pipe or duct is maintained during longitudinal expansion or contraction of thereof.

While embodiments and applications of this invention have been shown and described, it would be apparent to those of ordinary skill in the art that many more modifications would be possible without departing from the inventive concepts herein. Thus, the invention is not to be limited except in the spirit of the appended claims.

What is claimed is:

1. A pipe and duct support apparatus comprising:
    a frame positioned adjacent the pipe or duct;
    a cradle comprising a strap member of a ductile material attached to the pipe or duct to provide support for the pipe or duct, said cradle being pivotally attached to side portions of said frame and suspended therebetween; and
    pivoting members for mounting said frame to a support surface, said pivoting members being pivotally secured to the support and pivoting longitudinally with respect to the pipe or duct,
    wherein said frame includes frame support members having cam following surfaces and wherein said pivoting members have cammed surfaces for engagement with said cam following surfaces on said frame support members.

2. The apparatus set forth in claim 1 wherein said frame further includes slotted tabs positions adjacent said cam following surfaces and extending perpendicularly thereto, and wherein said pivoting members further include detents positioned adjacent said cammed surfaces and extending perpendicularly thereto for engagement in the slotted tabs of said frame.

3. The apparatus set forth in claim 1 wherein said frame is configured to circumscribe at least a portion of the pipe or duct.

4. The apparatus set forth in claim 1 wherein said strap member has sufficient thickness to provide lateral and vertical support and has surface contact with the pipe or duct such that the temperature of the cradle is similar to that of the pipe or duct.

5. The apparatus set forth in claim 4 wherein said strap member is attached by welding to the pipe or duct.

6. A pipe and duct support apparatus comprising:
    a frame positioned to circumscribe the pipe or duct, said frame having cam following surfaces and slotted tabs positioned adjacent said cam following surfaces, extending perpendicularly thereto;
    a cradle comprising a strap member of a ductile material attached to the pipe or duct said strap member having sufficient thickness to provide lateral and vertical support for the pipe or duct, said cradle being pivotally attached to side portions of said frame and suspended therebetween and having surface contact with the pipe or duct such that the temperature of the cradle is similar to that of the pipe or duct;
    rocker arms pivotally secured to a support surface for supporting said frame, said rocker arms including cammed surfaces for engagement with the cam following surfaces on said frame and further including detents positioned adjacent said cammed surfaces, extending perpendicularly thereto for engagement in the slotted tabs of said frame; and
    a keel member attached to said cradle extending perpendicularly from the surface thereof, said keel member being slidably mounted on a support surface.

* * * * *